United States Patent [19]
Madaj et al.

[11] Patent Number: 5,889,068
[45] Date of Patent: Mar. 30, 1999

[54] WATER BLOWN POLYURETHANE SOLING SYSTEMS

[75] Inventors: Edmund J. Madaj, Imperial, Pa.; William E. Slack, Moundsville, W. Va.

[73] Assignee: Bayer Corporation, Pittsburgh, Pa.

[21] Appl. No.: 899,556

[22] Filed: Jul. 24, 1997

[51] Int. Cl.$^6$ .............................. C08J 9/04; C08L 75/08; C08G 18/48; C08G 18/76
[52] U.S. Cl. .......................... 521/137; 521/51; 521/159; 521/160; 521/174; 521/176; 521/914
[58] Field of Search .................... 521/51, 137, 159, 521/160, 174, 176, 914

[56] References Cited

U.S. PATENT DOCUMENTS

| | | | |
|---|---|---|---|
| 3,523,918 | 8/1970 | Gonzalez | 428/318.8 |
| 3,644,457 | 2/1972 | König et al. | 560/351 |
| 3,726,952 | 4/1973 | Boden et al. | 264/48 |
| 3,836,487 | 9/1974 | Carter, Jr. | 428/310.5 |
| 3,925,527 | 12/1975 | Kleimann et al. | 264/53 |
| 4,020,001 | 4/1977 | White | 252/182 |
| 4,024,090 | 5/1977 | von Bonin et al. | 521/110 |
| 4,055,548 | 10/1977 | Carleton et al. | 528/59 |
| 4,065,410 | 12/1977 | Schäfer et al. | 521/51 |
| 4,115,429 | 9/1978 | Reiff et al. | 560/351 |
| 4,118,411 | 10/1978 | Reiff et al. | 560/351 |
| 4,160,080 | 7/1979 | Köenig et al. | 528/59 |
| 4,261,852 | 4/1981 | Carroll et al. | 528/59 |
| 4,305,991 | 12/1981 | Meyborg et al. | 428/318.8 |
| 4,477,602 | 10/1984 | Liang et al. | 521/137 |
| 4,490,300 | 12/1984 | Allen et al. | 560/330 |
| 4,490,301 | 12/1984 | Pantone et al. | 558/330 |
| 4,546,122 | 10/1985 | Radovich et al. | 521/127 |
| 4,738,991 | 4/1988 | Narayan | 521/124 |
| 4,866,103 | 9/1989 | Cassidy et al. | 521/159 |
| 5,166,183 | 11/1992 | Franyutti et al. | 521/51 |
| 5,332,763 | 7/1994 | Koshute | 521/129 |
| 5,342,856 | 8/1994 | Weber et al. | 521/51 |
| 5,514,723 | 5/1996 | Madaj et al. | 521/51 |
| 5,585,409 | 12/1996 | Volkert et al. | 521/51 |
| 5,618,967 | 4/1997 | Narayan et al. | 560/26 |
| 5,624,966 | 4/1997 | Narayan et al. | 521/51 |
| 5,814,676 | 9/1998 | Jacobs et al. | 521/174 |
| 5,821,275 | 10/1998 | Madan et al. | 521/159 |

FOREIGN PATENT DOCUMENTS

| | | |
|---|---|---|
| 1277471 | 12/1990 | Canada . |
| 48-62745 | 9/1973 | Japan . |
| 994890 | 6/1965 | United Kingdom . |

*Primary Examiner*—Rabon Sergent
*Attorney, Agent, or Firm*—Joseph C. Gil; N. Denise Brown

[57] ABSTRACT

This invention relates to molded articles comprising micro cellular polyurethane foams, preferably integral skin foams. These exhibit improved properties and are particularly suitable for soling systems in footwear. The present invention also relates to a process for the production of these molded articles. These molded articles comprise the reaction product of (A) an isocyanate comprising a stable, liquid MDI based prepolymer containing an allophanate-modified MDI, with (B) an isocyanate reactive component, in the presence of (C) at least one blowing agent.

16 Claims, No Drawings

WATER BLOWN POLYURETHANE SOLING SYSTEMS

BACKGROUND OF THE INVENTION

This invention relates to integral skin foams having improved properties, and a process for the production of these foams. These foams are prepared from an isocyanate comprising a stable, liquid MDI based prepolymer containing an allophanate-modified MDI.

Liquid diphenylmethane diisocyanates and their use in the preparation of integral skin foams is generally known in the art. Various types of liquid diphenylmethane diisocyanates include, for example, isocyanate prepolymers, allophanate-group containing isocyanates, carbodiimide group containing isocyanates, biuret group containing isocyanates, etc. These are described in, for example, U.S. Pat. Nos. 3,644,457, 4,055,548, 4,115,429, 4,118,411, 4,160,080, 4,261,852, 4,490,300, 4,738,991 and 4,866,103, and GB 994,890.

Integral skin foams prepared from polyurethane are also well known in the art. These are described in, for example, U.S. Pat. Nos. 3,523,918, 3,726,952, 3,836,487, 3,925,527, 4,020,001, 4,024,090, 4,065,410, 4,305,991 and 5,166,183; and CA 1,277,471.

U.S. Pat. No. 3,644,457 discloses room temperature stable liquid isocyanates derived from one mole of diphenylmethane diisocyanate and 0.1 to 0.3 mols of poly-1,2-propylene ether glycol.

U.S. Pat. No. 4,055,548 discloses liquid isocyanate prepolymer compositions obtained by reacting polymethylene polyphenylisocyanate containing from about 65 to 85 percent by weight of methylene bis(phenyl)isocyanate with a polyoxyethylene glycol having molecular weight of from 200 to 600 in an equivalent ratio of 0.0185 to 0.15:1.

U.S. Pat. Nos. 4,115,429 and 4,118,411 disclose low temperature (as low as $-5°$ C.), storage stable liquid diphenylmethane diisocyanates which are produced by reacting diphenylmethane diisocyanates having a specified 2,4-isomer content with propylene glycol or poly-1,2-propylene ether glycol.

U.S. Pat. No. 4,261,852 discloses liquid polyisocyanate compositions comprising (a) the reaction product of 90 to 50% by weight of a reaction product of diphenylmethane diisocyanate and a polyoxypropylene diol or triol having a hydroxyl equivalent weight of from 750 to 3000, said reaction product having an NCO content of from 8 to 26% by weight, and (b) from about 10 to 50% by weight of a diphenylmethane diisocyanate containing from 30 to 65% by weight of diphenylmethane diisocyanate, the remainder being polymethylene polyphenyl polyisocyanate.

U.S. Pat. No. 4,490,300 discloses room temperature stable liquid isocyanates which are derived by reacting diphenylmethane diisocyanate with an aliphatic diol having a pendant aromatic group, e.g., 2-methyl-2-phenyl-1,3-propanediol or phenyl-1-2-ethanediol.

U.S. Pat. No. 4,490,301 discloses room temperature stable liquid isocyanates which are derived by reacting diphenylmethane diisocyanate with monoallylether of trimethylolpropane.

U.S. Pat. No. 4,738,991 discloses organic polyisocyanates characterized by allophanate linkages which are prepared by reacting an organic polyisocyanate including 2,4- and 4,4-methylenediphenyl diisocyanate with poly- or monohydric alcohol in the presence of an organometallic catalyst. The catalyst is then deactivated using a compound such as an inorganic acid, organic acid, organic chloroformate or an organic acid chloride. This reference also discloses that flexible foams can be prepared from these allophanate group containing isocyanates. All of the examples relate to TDI based allophanate group containing isocyanates, and only one of these prepares a high resilience flexible foam.

U.S. Pat. No. 4,866,103 discloses a polyisocyanate composition for use in producing elastomers in a RIM process. This polyisocyanate composition is the reaction product of an alcohol and/or thiol having an average functionality of from about 1.5 to about 4 and an average equivalent weight of at least 500 with at least 2 equivalents per hydroxyl and/or thiol equivalent of an organic polyisocyanate including 4,4- and 2,4-isomers of diphenylmethane diisocyanate. The disclosed reaction is carried out under conditions such that at least about 20% of the initially formed urethane and/or thiourethane groups are converted to allophanate and/or thio allophanate groups.

Another process for the preparation of allophanates which contain isocyanates is disclosed in British Patent 994,890 which relates to the reaction of urethane isocyanates with excess diisocyanate either by heat alone or in the presence of a catalyst such as a metal carboxylate, a metal chelate or a tertiary amine, until the isocyanate content is reduced to that which is obtained theoretically when the complete reaction of the urethane groups is achieved.

U.S. Pat. No. 4,160,080 discloses a process for producing allophanate-containing aliphatically and/or cycloaliphatically bound isocyanate groups. In this disclosed process, compounds containing urethane groups are reacted with polyisocyanates having aliphatic and/or cycloaliphatic isocyanate groups in the presence of a strong acid. The process is generally conducted at a temperature of from $90°$ C. to $140°$ C. for about 4 to 20 hours.

Japanese Patent Application No. 1971-99176 discloses a method of preparing liquid diphenylmethane diisocyanate by reacting diphenylmethane diisocyanate with an aliphatic monovalent alcohol.

Integral skin foams are described and prepared in U.S. Pat. No. 4,305,991. These foams are prepared from a reaction mixture containing a polyisocyanate wherein the isocyanate groups are aliphatically and/or cycloaliphatically bound. These polyisocyanates may contain adducts such as, for example, carbodiimide-, allophanate-, isocyanurate-, uretdione-, biuret-groups, etc. The aliphatic isocyanates used to prepare these foams provide resistance to UV light and to decomposition by heat.

U.S. Pat. No. 5,166,183 also describes integral skin foams. The polyisocyanate composition used therein has an NCO content of about 16 to 25%, and consists of i) from 10 to 100 parts by weight of an isocyanate having an NCO content of about 16 to 22% which is prepared by blending methylenebis(phenyl isocyanate) and a carbodiimide group modified methylenebis(phenyl isocyanate), followed by reacting with a polyester diol to form a product. This product is then blended with ii) from 0 to 90 parts by weight of a modified isocyanate having an NCO content of about 18 to 25% which is prepared by reacting methylenebis(phenyl isocyanate) with poly-1,2-propylene ether glycol. The presence of the carbodiimide-modified isocyanate in the prepolymer serves to reduce the freezing point.

The integral skin foams of the '183 patent are described as exhibiting improved abrasion resistance. This is contributed to by the use of a polyester in the prepolymer formation. Polyesters, however, add to the cost of the prepolymer and have decreased miscibility (solubility) with polyethers such that the processing of the systems is difficult.

Carbodiimide modified isocyanates are also disclosed as suitable isocyanates for the production of integral skin foams in U.S. Pat. No. 5,342,856. These isocyanates are reacted with an isocyanate-reactive component and a solution of a zinc carboxylate in an aliphatic polyamine. These solutions of zinc carboxylates in aliphatic polyamines and water are essential to the preparation of integral skin foams.

U.S. Pat. No. 4,477,602 describes a system for the production of polyurethanes with improved low temperature flex-fatigue resistance and green strength. A key component of this system is a dispersion of a polyurea and/or a polyhydrazodicarbonamide in an organic compound. The examples also employ CFC-11 as the primary blowing agent with water as a minor blowing agent.

U.S. Pat. No. 5,585,409 describes a process for producing molded polyurethanes with a cellular core and a compact surface zone. These polyurethanes are produced from a system comprising an isocyanate semi-prepolymer containing ester groups which is prepared from a polyester polyol and a branched chain dihydroxy compound containing at least one bonded ester unit.

U.S. Pat. No. 5,624,966 describes a polyurethane composition for producing polyurethane articles having a tensile strength greater than or equal to 450 psi and/or a Taber abrasion (mg loss) of less than 200.

U.S. Pat. No. 5,514,723 describes an improvement over the process disclosed in U.S. Pat. No. 5,166,183. More specifically, the '723 patent relates to the discovery that a particular combination of catalysts improves the ratio of the tensile strength of the skin to the tensile strength of the core of the integral skin foams described in the '183 patent. This catalyst combination comprises: a) a diorganotin sulfide corresponding to a specific formula, b) a tertiary amine, and c) a tin compound capable of catalyzing the reaction between an isocyanate group and an active hydrogen atom, with the proviso that c) is not a diorganotin sulfide as described in a).

Applicants' copending application Ser. No. 08/680,094, filed on Jul. 15, 1996, which is commonly assigned, relates to integral skin foams. These foams are prepared from an isocyanate comprising a stable, liquid MDI based prepolymer containing an allophanate-modified MDI. The integral skin foams of this application had superior abrasion resistance in comparison to integral skin foams made with different isocyanates. These integral skin foams did not, however, exhibit the flexural properties required for footwear applications.

Furthermore, when allophanate-modified isocyanates were used in formulations expected to yield better flexural properties, it was found that certain allophanate modified isocyanate prepolymers were superior to the allophanate modified isocyanates required in this copending application.

The improved abrasion resistance described in the above copending application would, actually, be of little advantage in the present invention, because the systems of the present invention already achieve superior abrasion resistance by other means. On the other hand, the improved flexural properties of the molded articles claimed in the present application are not obvious from, nor would these be expected from consideration of the copending application.

An object of the present invention was to develop a polyurethane integral skin system especially suited for soling or shoe sole (i.e., footwear) applications. This requires that the system possesses superior dynamic flexural fatigue properties. It was preferred that these systems use a blowing agent comprising water.

Another object was to avoid the disadvantages resulting from the use of polyester-extended prepolymers. Such disadvantages include, for example, high viscosities, high costs, and susceptibility to hydrolysis.

SUMMARY OF THE INVENTION

This invention relates to a molded article comprising a micro cellular polyurethane foam, preferably a shoe sole, and to the process of producing this molded article comprising a micro cellular polyurethane foam. This polyurethane product is formed by reacting (A) a stable, liquid MDI-based prepolymer containing an allophanate-modified MDI, with (B) an isocyanate-reactive composition, and (C) a blowing agent. The (A) stable, liquid MDI-based prepolymers having an NCO content of 5 to 30%, contain an allophanate-modified MDI, and comprise the reaction product of:

1) an allophanate-modified MDI prepared by reacting
   i) an aliphatic alcohol or an aromatic alcohol, wherein said alcohol contains less than 17 carbon atoms, with
   ii) diphenylmethane diisocyanate comprising about 0 to 60% by weight of 2,4'-diphenylmethane diisocyanate, less than 6% by weight of the 2,2'-diphenylmethane diisocyanate, and the rest being 4,4'-diphenylmethane diisocyanate, and 2) a polyether polyol containing from 2 to 3 hydroxyl groups, preferably 2 hydroxyl groups, and having a molecular weight of about 750 to 10,000, preferably about 1,000 to about 6,000, wherein the polyether polyol is prepared from a starter compound with ethylene oxide and propylene oxide in a weight ratio of 10:90 to 70:30, preferably 13:87 to 50:50, and most preferably 15:85 to 35:65.

Suitable (B) isocyanate-reactive compositions comprise:

(1) from about 25 to about 92% by weight, based on the total weight of component (B), of at least one polyether polyol having a functionality of about 2 and a molecular weight of from about 3,000 to about 8,000, (2) from about 5 to about 72% by weight, based on the total weight of component (B), of a filled polyol (preferably a dispersion of a polyurea and/or a polyhydrazodicarbonamide in an organic compound containing at least two hydroxyl groups, or a SAN graft polyol) wherein said filled polyol has a functionality of about 2.5 to 3 (preferably 3) and a molecular weight of from about 3,000 to about 8,000 (preferably about 4,800 to about 6,000), and (3) from about 3% up to about 30% by weight, based on the total weight of component (b), of at least one organic compound containing from 2 to 4 hydroxyl groups and having a molecular weight of from about 28 to about 250.

Preferred compounds to be used as component (B)(3) are 1,4-butanediol, ethylene glycol and mixtures thereof, with ethylene glycol being most preferred.

Components (A) and (B) above are reacted in the presence of (C) a blowing agent which preferably comprises water, and optionally, (D) other additives. Other additives include, for example, one or more catalysts and/or one or more surfactants.

Components (A) and (B) are present in quantities such that the isocyanate index is from about 90 to 110, preferably from about 96 to 103.

This invention also relates to a process for the production of these molded articles comprising micro cellular polyurethane foamed products.

DETAILED DESCRIPTION OF THE INVENTION

Suitable stable, liquid MDI based prepolymers having an NCO content of from about 5 to 30%, preferably of 15 to 25%, more preferably of 17 to 23%, and most preferably 18 to 20%, and containing an allophanate-modified MDI. These stable, liquid MDI based prepolymers comprise the reaction product of: 1) an allophanate-modified MDI and 2) a polyether polyol. These isocyanate prepolymers are known and described in, for example, U.S. Pat. No. 5,319,053, the disclosure of which is herein incorporated by reference.

Suitable 1) allophanate-modified MDI to be used in the preparation of the stable, liquid MDI based prepolymer comprises the reaction product of (i) an aliphatic alcohol or an aromatic alcohol, wherein said alcohol contains less than 17 carbon atoms, preferably from about 2 to about 8 carbon atoms, and (ii) diphenylmethane diisocyanate comprising about 0 to 60% by weight of 2,4'-diphenylmethane diisocyanate, less than 6% by weight of the 2,2'-diphenylmethane diisocyanate, and the remainder being 4,4'-diphenylmethane diisocyanate. Some compounds suitable for use as the aliphatic alcohols (i) include, for example, isomeric butanols, isomeric propanols, isomeric pentanols, isomeric hexanols, cyclohexanol, 2-methoxyethanol, 2-bromoethanol, etc. Suitable aromatic alcohols for use in the preparation of the allophanate-modified prepolymer include, for example, phenol, 1-naphthol, m-cresol, and p-bromophenol. Preferred aliphatic alcohols are 1-butanol, 1-pentanol, and 1-propanol. Preferred aromatic alcohols are phenol and m-cresol. The aliphatic alcohols are particularly preferred.

The diphenylmethane diisocyanate preferably comprises about 0 to about 6% of the 2,4'-isomer of MDI, about 0 to about 2% of the 2,2'-isomer of MDI, and about 92 to about 100% of the 4,4'-isomer of MDI. It is preferred that the 1) allophanate-modified MDI is also a stable liquid and has an NCO content of about 15 to 30%.

Suitable polyether polyols 2) to be reacted with 1) the allophanate-modified MDI to form the presently required A) stable, liquid MDI prepolymers containing an allophanate-modified MDI include those polyether polyols containing from about 1.5 to 3 hydroxyl groups, preferably 1.8 to 3 hydroxyl groups, more preferably 2 to 3, and most preferably 2 hydroxyl groups, and having molecular weights of about 750 to about 10,000, preferably about 1,000 to about 6,000. These polyether polyols include those having low unsaturation, which may be prepared from, for example, a double metal cyanide catalyst. These polyether polyols having a low monol content can be prepared by any of the known processes such as those described in, for example, U.S. Pat. Nos. 5,523,386, 5,527,880, 5,536,883, 5,563,221, 5,589,431, 5,596,075 and 5,637,673, the disclosures of which are herein incorporated by reference.

These polyether polyols may be obtained in known manner by the reaction of a suitable starter compound which contains reactive hydrogen atoms, with ethylene oxide and propylene oxide in a weight ratio of from 10:90 to 70:30, preferably 13:87 to 50:50, and most preferably 15:85 to 35:65 (EO:PO ratio). Suitable starter compounds containing reactive hydrogen atoms include, for example, the polyhydric alcohols such as, for example, ethylene glycol, propylene glycol-(1,2) and -(1,3); butylene glycol-(1,4) and -1(1, 3); hexanediol-(1,6); octanediol-(1,8); neopentyl glycol, cyclohexanedimethanol (1,4-bis-hydroxymethylcyclohexane); 2-methyl-1,3-propanediol; 2,2,4-trimethyl-1,3-pentanediol, triethylene glycol, tetraethylene glycol, polyethylene glycol; dipropylene glycol; polypropylene glycol; dibutylene glycol and polybutylene glycol; glycerine and trimethylolpropane; and, in addition, water, methanol, ethanol, 1,2,6-hexane triol, 1,2,4-butane triol, trimethylol ethane, pentaerythritol, mannitol, sorbitol, methyl glycoside, sucrose, phenol, isononyl phenol, resorcinol, hydroquinone, and 1,1,1- or 1,1,2-tris-(hydroxylphenyl)-ethane. Preferred starter compounds for the polyether polyols of the present invention include, for example, propylene glycol, glycerine, water, ethylene glycol, diethylene glycol, and trimethylolpropane.

Preferred polyether polyols for the preparation of the stable liquid MDI based prepolymer containing allophanate groups are those compounds having a functionality of about 2, molecular weights of about 1,000 to about 6,000, and prepared by alkoxylation of a suitable starter (preferably, propylene glycol) with ethylene oxide, propylene oxide or mixtures thereof in an EO:PO weight ratio of 10:90 to 70:30, preferably 13:87 to 50:50, and most preferably of 15:85 to 35:65.

The above described liquid MDI-based prepolymer containing allophanate groups are reacted with an isocyanate-reactive composition (B) to form the polyurethane article of the present invention. Suitable isocyanate-reactive compositions comprise (1) from about 25 to about 92%, preferably 65 to 85% by weight, based on the total weight of component (B), of at least one polyether polyol having a functionality of about 2 and a molecular weight of from about 3000 to about 8000, preferably about 3500 to 4500; (2) from about 5 to about 72%, preferably 5 to 25% by weight, based on the total weight of component (B), of at least one filled polyol having a functionality of about 2.5 to about 3, preferably about 3, and a molecular weight of from about 3,000 to about 8,000, preferably about 4,800 to about 6,000; and (3) from about 3 to about 30%, preferably 3 to 15% by weight, based on the total weight of component (B), of at least one organic compound containing from about 2 to about 4 hydroxyl groups, preferably about 2 hydroxyl groups, and having a molecular weight of from about 28 to about 250, preferably 60 to 110.

Suitable polyether polyols to be used as component (B)(1) of the present invention include, for example, those having a functionality of about 2, preferably 2, and a molecular weight of from about 3,000 to about 8,000, preferably 3500 to 4500. Suitable high molecular weight polyethers for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH or double metal cyanides, or by chemically adding these epoxides, preferably ethylene oxide and propylene oxide, in admixture or successively to components containing reactive hydrogen atoms such as water, polyols or amines. Examples of suitable polyols and amines which can be used as starter compounds for component (B)(1) include the low molecular weight diols, diamines and aminoalcohols as are known in the art. Suitable examples of these types of compounds are as set forth hereinafter and include, propylene glycol, ethylene glycol, water, bisphenol A, N,N'-dimethylethylenediamine, N-methylethanolamine, etc. It is preferred to use polyether polyols having a functionality of 2, molecular weights of about 3000 to about 8000, and prepared by alkoxylation of a suitable starter with ethylene oxide, and preferably, propylene oxide, or mixtures thereof. Preferred starter compounds include propylene glycol, water, ethylene glycol and diethylene glycol.

It is, of course, also possible to use mixtures of diols, diamines and/or aminoalcohols with a small amount of monool, triol, triamine, etc. as starter compounds for component (B)(1), provided that the mixture satisfies the above functionality requirements.

Suitable compounds to be used as component (B)(2) in the present invention are filled polyols. The term "filled polyol" as used herein means: (i) dispersions of polyureas and/or polyhydrazodicarbonamides in relatively high molecular weight organic compounds containing at least two hydroxyl groups, (ii) polymer polyols prepared by polymerizing one or more ethylenically unsaturated monomers, such as styrene and acrylonitrile, in relatively high molecular weight organic compounds containing at least two hydroxyl groups, and (iii) mixtures thereof. These filled polyols are known and can be characterized as hydroxyl containing compounds which contain high molecular weight polyadducts, polycondensates or polymers in finely dispersed or dissolved form.

Polymer polyols suitable for the present invention are known. Methods for their manufacture are described in U.S. Pat. Nos 3,383,351, 3,304,273, 3,523,093, 3,652,639, 3,823,201, and 4,390,645, all the disclosures which are hereby incorporated by reference. The polyurea and/or polyhydrazodicarbonamide dispersions suitable for the present invention are also known and are prepared by reacting an organic polyisocyanate with polyamines containing primary and/or secondary amine groups, hydrazines, hydrazides, or a mixture thereof in the presence of relatively high molecular weight hydroxyl-containing materials. These dispersions are described in U.S. Pat. Nos. 4,042,537, 4,089,835, 3,325,421, 4,092,275, 4,093,569, 4,119,613, 4,147,680, 4,184,990, 4,293,470, 4,296,213, 4,305,857, 4,305,858, 4,310,448, 4,310,449, 4,324,716, 4,374,209, 4,496,678, 4,523,025, 4,668,734, 4,761,434, and 4,847,320, all the disclosures of which are hereby incorporated by reference. The dispersions typically have solids contents of from 1 to 40% by weight and preferably from 10 to 30% by weight. It is preferred that component (B)(2) comprises a so-called PHD (polyhydrazodicarbonamide dispersion) polyol.

Suitable organic compounds to be used as component (B)(3) in the isocyanate-reactive composition include, for example, those organic compounds containing from 2 to 4 (preferably about 2) hydroxyl groups, amino groups, and mixtures thereof and having molecular weights of about 28 to about 250. Suitable compounds include, for example, diols, triols, tetraols, diamines, triamines, aminoalcohols, and mixtures thereof.

Some examples of suitable hydroxyl group containing compounds include glycols, such as, for example, ethylene glycol, propylene glycol, 1,2- and 1,3-propane diol, 1,3- and 1,4- and 2,3-butanediol, 1,6-hexanediol, dipropylene glycol, tripropylene glycol, diethylene glycol (i.e., DEG), triethylene glycol (i.e., TEG), tetraethylene glycol, tetrapropylene glycol, heptapropylene glycol, 2-methyl-1,3-propanediol, 1,10-decanediol, neopentyl glycol, 2,2,4-trimethylpentane-1,3-diol, bis-(hydroxyethyl)-hydroquinone, glycerol, trimethylolpropane, etc. Preferred low molecular weight compounds include ethylene glycol, 1,4-butanediol, and mixtures thereof. Ethylene glycol is most preferred.

The present invention also requires at least one blowing agent. Suitable blowing agents include, for example, water, and physical blowing agents including, for example, low boiling alkanes, partially or completely fluorinated hydrocarbons, etc. Suitable low boiling alkanes include compounds such as, for example, acetone, pentane, hexane, cyclopentane, etc. Some examples of suitable partially or completely fluorinated hydrocarbons include compounds such as HFC-134a (1,1,1,2-tetrafluoroethane), HFC-245fa (1,1,1,3,3-pentafluoropropane), HFC-245ca (1,1,2,2,3-pentafluoropropane), HFC-236ca (1,1,1,2,3,3-hexafluoropropane). Methylene chloride is also a suitable blowing agent for the presently claimed invention. Mixtures of these various blowing agents are also suitable. It is preferred that the blowing agent comprises water.

When water is used as the sole blowing agent, it is typically used in the present invention in quantities of between about 0.05 to 1% by weight, and preferably between about 0.35 to 0.7% by weight, based on the total weight of the B-side of the formulation. Of course, as described above, water may be used in combination with other blowing agents. The above ranges for water are reduced when mixtures of water and another blowing agent are used in the present invention. For example, if a physical blowing agent is also used, the quantity of water to be added is between about 0.05 to 0.3% by weight (based on the total weight of the B-side of the formulation). Blowing agent mixtures of this type are required to be present in quantities which are typical of a conventional process for producing an integral skin foam. In the present invention, blowing agents are added in an amount necessary to produce a foam of the desired density which is determined by the application or end-use. For example, in micro cellular or integral skin foams, and particularly in shoe soles, the density of the molded foam is usually from about 0.2 to about 0.6 g/cc (i.e., 20 to 35 pcf. Occasionally, densities can be as high as about 1 g/cc such as, for example, in dual-density shoe soles where a higher density out-sole is attached to a lower-density mid-sole.

One or more catalyst is also required to be present in the reaction mixture according to the present invention. Suitable catalysts include, for example, tertiary amine catalysts and organometallic catalysts.

Some examples of suitable organometallic catalysts include, for example organometallic compounds of tin, lead, iron, bismuth, mercury, etc. Preferred organotin catalysts include compounds such as, for example, tin acetate, tin octoate, tin ethylhexanoate, tin oleate, tin laurate, dimethyltin dilaurate, dibutyltin oxide, dibutyltin dichloride, dimethyltin dichloride, dibutyltin diacetate, diethyltin diacetate, dimethyltin diacetate, dibutyltin dilaurate, diethyltin dilaurate, dimethyltin dilaurate, dibutyltin maleate, dimethyltin maleate, dioctyltin diacetate, dioctyltin dilaurate, di(2-ethylhexyl)tin oxide, etc. Other suitable catalysts for the present invention include, for example, dialkyltin mercaptides such as, for example, dibutyltin dimercaptide, dibutyltin diisooctylmercaptoacetate, dimethyltin dimercaptide, dibutyltin dilaurylmercaptide, dimethyltin dilaurylmercaptide, dimethyltin diisooctylmercaptoacetate, di(n-butyl)tin bis(isooctylmercaptoacetate), and di(isooctyl) tin bis(isooctylmercaptoacetate), all of which are commercially available from Witco Chemical Corp., and are especially preferred; and dialkyltin disulfides such as, for example, dibutyltin sulfide and dioctyltin sulfide are also suitable catalysts. The use of a delayed action catalyst such as an iron pentanedione or a bismuth carboxylate, as described in U.S. Pat. No. 4,611,044, herein incorporated by reference, is also possible.

Suitable heat-activated catalysts for the present invention are amine salts. These catalysts include aliphatic and aromatic tertiary amines, and epoxide adducts of tertiary amines. Quaternary ammonium salts of amines (i.e., alkoxylated tertiary amines) as described in, for example, U.S. Pat. Nos. 3,892,687, 4,116,879 and 4,582,861, the disclosures of which are herein incorporated by reference are also suitable in the present invention. Suitable heat-activated amine salts include compounds such as, for example, DABCO 8154 commercially available from Air Products, a formic acid blocked triethylene diamine, and other delayed action catalysts such as DABCO WT, also commercially available from Air Products; and Polycat SA-1 and Polycat SA-102 which are both acid-blocked versions of 1,8-diazabicyclo[5.4.0]-undecene-7 (i.e., Polycat DBU) and commercially available from Air Products. Trialkyl amines and heterocyclic amines are also suitable for the present invention. Suitable compounds include, for example, trimethylamine, triethylamine, tripropylamine, tributylamine, dimethylcyclohexylamine, dibutylcyclohexylamine, dimethylethanolamine, triethanolamine, diethylethanolamine, ethyldiethanolamine, dimethylisopropanolamine, triisopropanolamine, triethylene diamine, tetramethyl-1,3-butanediamine,N,N,N',N'-tetramethylethylenediamine, N,N,N',N'-tetramethylhexanediamine-1,6, N,N,N',N',N''-pentamethyl diethylenetriamine, bis(2-dimethylaminoethoxy)-methane, N,N,N'-trimethyl-N'-(2-hydroxyethylethyldiamine, N,N-dimethyl-N',N'-(2-hydroxyethyl)-ethylenediamine, tetramethylguanidine, N-methylpiperidine, N-ethylpiperidine, N-methylmorpholine, N-ethylmorpholine, 1,4-dimethylpiperidine, 1,2,4-trimethylpiperidine, N-(2-dimethylaminoethyl)-morpholine, 1-methyl-4-(2-dimethylamino)-piperidine, 1,4-diazabicyclo-[2.2.2]octane, 2-methyl-1,4-diazabicyclo [2.2.2]octane quinuclidine, 1,5-diazabicyclo[5.4.0]-5-undecene, and 1,5-diazabicyclo-[4.3.0]-5-nonane.

Organometallic catalysts are usually used in amounts ranging from about 0.005 to about 0.5% by weight, preferably about 0.02 to 0.4% by weight, based on the total weight of the B-side of the formulation. Tertiary amine catalysts, or salts thereof, are advantageously used in amounts ranging from about 0.05 to about 2% by weight, preferably about 0.1 to about 0.5% by weight, based on 100% by weight, based on the total weight of the B-side of the formulation. It is preferred that the total quantity of catalysts be such that they comprise less than 3% by weight, preferably less than 2% by weight, based on the total weight of the B-side of the formulation.

It is also possible that various additives and/or auxiliary agents may be included in the formulation. Some examples of suitable additives include surface-active additives such as emulsifiers and foam stabilizers. Examples of these include N-stearyl-N',N'-bis-hydroxyethyl urea, oleyl polyoxyethylene amide, stearyl diethanol amide, isostearyl diethanolamide, polyoxyethylene glycol monoleate, a pentaerythritol/adipic acid/oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may be used as surface-active additives.

Suitable foam stabilizers include water-soluble polyether siloxanes. The structure of these compounds is generally such that a copolymer of ethylene oxide and propylene oxide is attached to a polydimethyl siloxane radical. Such foam stabilizers are described in U.S. Pat. No. 2,764,565.

In addition to the surface-active agents, other additives which may be used in the molding compositions of the present invention include known internal mold release agents, pigments, cell regulators, flame retarding agents, plasticizers, dyes, fillers and reinforcing agents such as glass in the form of fibers or flakes or carbon fibers, and antistatic agents.

The molded articles of the present invention can be produced from any of the conventional processes suitable for producing micro cellular foams. These include, for example, open mold processes, closed mold processes, and direct attach processes. This can be done with both high pressure and low pressure foaming equipment. Additional details regarding these processes can be found in, for example, Polyurethane Handbook, 2nd Edition, Edited by Gunter Oertel, Chapter 7, pp. 329–386, Hanser Publishers, Munich, N.Y.

The compositions according to the present invention may be molded using conventional processing techniques at isocyanate indexes ranging from about 95 to 105 (preferably from 96 to 100). The term "Isocyanate Index" (also commonly referred to as "NCO index"), is defined herein as the equivalents of isocyanate, divided by the total equivalents of isocyanate-reactive hydrogen containing materials, multiplied by 100.

As used herein, the phrase "B-side" refers to the mixture which contains the isocyanate-reactive compositions (B)(1), (B)(2) and (B)(3), blowing agent (C), and any catalysts, surfactants, or other additives which are pre-mixed with these components prior to being reacted with the isocyanate component.

The term "molecular weight" as used herein refers to the number average molecular weight as determined by end-group analysis.

The following examples further illustrate details for the process of this invention. The invention, which is set forth in the foregoing disclosure, is not to be limited either in spirit or in scope by these examples. Those skilled in the art will readily understand that known variations of the conditions of the following procedures can be used. Unless otherwise noted, all temperatures are degrees Celsius and all parts are parts by weight.

EXAMPLES

The following components were used in the working examples:

| | |
|---|---|
| Polyol A: | a polyether diol having an OH number of about 28, prepared from propylene glycol, propylene oxide, and ethylene oxide, the weight ratio of propylene oxide to ethylene oxide being 70:30, with about 100% of the OH groups being primary. |
| Polyol B: | a dispersion having an OH number of about 28 and consisting of a polyhydrazodicarbonamide in a glycerin initiated propylene oxide/ethylene oxide polyether (having an OH number of about 35, with a propylene oxide to ethylene oxide weight ratio of about 5:1). This polyol was produced by reacting toluene diisocyanate and hydrazine in the presence of the glycerin initiated polyether as described in U.S. Pat. No. 4,042,537, the disclosure of which is herein incorporated by reference. The resulting dispersion has a solids content of about 20% by weight. |
| 1,4-BD: | 1,4-butanediol |
| EG: | ethylene glycol |
| CAT A: | a 1:3 mixture of triethylene diamine in 1,4-butanediol commercially available from Air Products as Dabco S-25 |
| CAT B: | a tertiary amine catalyst consisting of 30% amine and 70% 1,4-butanediol, commercially available from Air Products as Dabco 1028 |
| CAT C: | dibutyltin dilauryl mercaptide, commercially available from Witco as UL-1 |
| CAT D: | dibutyltin dilaurate catalyst, commercially available from Air Products as T-12 |
| CAT E: | an n-alkyl substituted organotin catalyst, commercially available as Topcat 190 from Tylo Industries, Parsippany, NJ. |
| L5309: | a commercially available polyalkyleneoxidedimethylsiloxane copolymer surfactant available from OSi Specialties, Inc. |
| ISO A: | an isocyanate having an isocyanate group content of about 19% by weight, and being prepared by reacting:<br>(i) 56 parts by weight of the 4,4'-isomer of methylenebis(phenyl isocyanate),<br>(ii) 6 parts by weight of a carbodiimide modified methylenebis(phenyl isocyanate) having an isocyanate group content of 29.3% and a viscosity at 25° C. of less than 100 mPa.s,<br>and<br>(iii) 38 parts by weight of a 2000 molecular weight polyester diol prepared by reacting adipic acid, 1,4-butane diol and ethylene glycol, wherein the molar ratio of ethylene glycol to butane diol is 1:1. (This isocyanate is identical to the isocyanate used in the examples of U.S. Pat. No. 5,514,723 at column 6, lines 34–46). |
| ISO I: | an allophanate modified prepolymer having an NCO content of about 18.9% by weight, and a viscosity of 440 mPa·s at 25° C., the prepolymer being a clear, light yellow product. |

This prepolymer was prepared by the following procedure: 100 parts by weight of MDI (98% by weight of 4,4'-MDI and 2% by weight of 2,4'-MDI) were added to a nitrogen padded reactor. While stirring the MDI at 50° C., 3.2 parts by weight of 1-butanol was added. This reaction exothermed to about 60° C. To the 60° C. reaction mixture, 0.008 part by weight of zinc acetylacetonate (ZnAcAc) was added. This mixture was then heated to 90° C. and held for about 1.5 hours. Then, 0.016 part by weight of benzoyl chloride stopper was added, and the reaction mixture was cooled to about 60° C. This formed an allophanate modified MDI having an NCO content of about 29.0% by weight. Finally, 48.9 parts by weight of Polyol A were added to the allophanate modified MDI while at 60° C. This mixture was held at 60° C. for about 1.5 hours, followed by cooling to 25° C. This formed a clear, light yellow product, which was an allophanate modified prepolymer exhibiting the NCO content and viscosity as set forth above.

Isocyanates B through L, all allophanate modified isocyanate prepolymers, were prepared using the same basic procedure as described above for ISO I, with differences in relative quantities of reactants, etc. as shown in TABLES 1A and 1B.

TABLE 1A

| Isocyanate[1] | ISO B | ISO C | ISO D | ISO E | ISO F |
|---|---|---|---|---|---|
| 1-Butanol; pbw | 2.6 | 3.21 | 3.2 | 3.2 | 3.2 |
| % NCO of AMI[2] | 29.9 | 29.0 | 29.0 | 29.0 | 29.0 |
| MW of Polyether[3] | 192 | 425 | 1000 | 2000 | 4000 |
| EO:PO wt ratio[4] | 0:100 | 0:100 | 0:100 | 0:100 | 0:100 |
| Polyether; pbw | 13.5 | 26.6 | 37.7 | 44.2 | 48.6 |
| % NCO of AMI Prepolymer | 20.5 | 18.7 | 19.1 | 18.8 | 18.9 |
| Viscosity of AMI Prepolymer at 25° C., mPa · s | 1765 | 1724 | 691 | 388 | 404 |

[1]parts of 1-butanol and polyether are per 100 parts by weight of MDI
[2]AMI: allophanate-modified isocyanate
[3]molecular weight of the polyether polyol used to prepare the AMI prepolymer. Propylene glycol was the initiator for the preparation of all the polyethers.
[4]wt. ratio of ethylene oxide (EO) to propylene oxide (PO) in polyether used to prepare prepolymer

TABLE 1B

| Isocyanate[1] | ISO G | ISO H | ISO I | ISO J | ISO K | ISO L |
|---|---|---|---|---|---|---|
| 1-Butanol; pbw | 3.2 | 3.2 | 3.2 | 3.2 | 7.8 | 7.8 |
| % NCO of AMI[2] | 29.0 | 29.0 | 29.0 | 29.0 | 23.0 | 23.0 |
| MW of Polyether[3] | 4000 | 4000 | 4000 | 2000 | 4000 | 4000 |
| EO:PO wt. ratio[4] | 20:80 | 13:87 | 30:70 | 50:50 | 20:80 | 30:70 |
| Polyether; pbw | 48.6 | 48.6 | 48.9 | 44.2 | 20.4 | 20.4 |
| % NCO of AMI Prepolymer | 19.0% | 18.9% | 18.9% | 18.9% | 18.8% | 18.8% |
| Viscosity of AMI Prepolymer at 25° C. mPa · s | 446 | 425 | 440 | 428 | 1020 | 1050 |

[1]parts of 1-butanol and polyether are per 100 parts by weight of MDI
[2]AMI: allophanate-modified isocyanate
[3]molecular weight of the polyether polyol used to prepare the AMI prepolymer. Propylene glycol was the initiator for the preparation of all the polyethers.
[4]wt. ratio of ethylene oxide (EO) to propylene oxide (PO) in polyether used to prepare prepolymer Isocyanates A, E and G were reacted with a polyol blend as indicated in Table 2 below. Flexural data were obtained from hand mixed foams run at a ratio of 100 parts of polyol blend to 74 parts of isocyanate (i.e., an NCO index of 98). Hand mixed foams were mixed for about 5 seconds at about 24° C. The examples in Tables 1 through 7 were hand-mixed foams.

The mold used for flexural studies was an aluminum panel mold, having inner dimensions of 6 inches by 6 inches by 5/8 inch, and had a series of parallel ridges beginning ½ inch from the edge of the mold and spaced ½ inch apart. Each ridge measured 1/8 inch high by 1/8 inch wide, and ran the entire 6 inch width of the mold. These ridges in the mold resulted in panels having grooves, which acted to make the panels more susceptible to cracking under repeated flexing. The panels were demolded in about 4 to about 5 minutes. Flex testing was done with a Ross flex tester using a modified method of ASTM-D-1052 wherein the test specimens were not cut.

TABLE 2

| Example: | Example 1 | Example 2 | Example 3 |
|---|---|---|---|
| Polyol A | 73.44 | 73.44 | 73.44 |
| Polyol B | 14.43 | 14.43 | 14.43 |
| 1,4-BD | 8.50 | 8.50 | 8.50 |
| EG | 0.97 | 0.97 | 0.97 |
| CAT A | 0.80 | 0.80 | 0.80 |
| CAT B | 0.50 | 0.50 | 0.50 |
| CAT C | 0.03 | 0.03 | 0.03 |
| CAT E | 0.25 | 0.25 | 0.25 |
| water | 0.38 | 0.38 | 0.38 |

TABLE 2-continued

| Example: | Example 1 | Example 2 | Example 3 |
| --- | --- | --- | --- |
| Isocyanate | ISO A | ISO E | ISO G |
| Isocyanate Index | 98 | 98 | 98 |

Allophanate modified prepolymers E and G resulted in molded panels exhibiting improved flexural performance as described in Table 3 below.

TABLE 3

| | |
| --- | --- |
| Example 1 (comparative) | First pair of samples failed; these were almost completely broken in two by 73,000 cycles. Second pair of samples showed damage at about 50,000 cycles; at 63,000 cycles, an open crack appeared in one of the samples; a shallow crack running completely across one of the samples appeared by about 70,000 cycles. |
| Example 2 (comparative) | No damage was apparent until about 100,000 cycles, then one panel began to crack; crack ran completely across one sample by 130,000 cycles; other panel showed some damage, but no cracks yet. |
| Example 3 | Some fatigue was apparent (i.e., stretch marks), but no cracks formed at 130,000 cycles. |

The testing of the examples set forth in TABLE 3 were run for 130,000 cycles before the testing was stopped.

Molded parts having the dimensions of 4 in.×5 in.×1 in. were used in Examples 1, 2 and 3.

TABLE 4

Physical Properties of Examples 1, 2 and 3

| Example | 1 | 2 | 3 |
| --- | --- | --- | --- |
| Density (g/cc) | 0.44 | 0.44 | 0.45 |
| Hardness (shore A) | 50 | — | 36 |
| Tensile Strength (psi) | 454.7 | 450.2 | 434.3 |
| Elongation (%) | 401.1 | 416.5 | 404.8 |
| Die C Tear | — | 74.2 | — |
| Ball Rebound (%) | 46 | — | 42.6 |

The following ASTM methods were used to determine the physical properties in the working examples of this application:

| | |
| --- | --- |
| Hardness | D-2240 |
| Tensile Strength | D-412 |
| Elongation | D-412 |
| Die C Tear | D-624 and D-3489 |
| Ball Rebound | D-3574 |
| Taber Abrasion | D-3489 |

The examples in Tables 2, 3 and 4 clearly demonstrate that the allophanate modified prepolymer isocyanates of the present invention form molded polyurethane parts (i.e., foams) which are particularly suitable for shoe sole applications (see Example 3). These molded parts exhibit improved flexural fatigue resistance in comparison to the current state of the art which uses carbodiimide modified, polyester-extended isocyanate prepolymer (see ISO A above), as set forth in Example 1, and as described in U.S. Pat. No. 5,514,723, and in comparison to molded parts based on an allophanate modified prepolymer isocyanate wherein the polyether used to prepare the prepolymer contains 100% PO groups.

Another series of hand mixed foamed panels were formed using the procedure as described above, with the exception of different polyol formulations being used, as set forth in Table 5, and the size of the mold was smaller. More specifically, the size of the mold used in this series of examples was only ⅜ inch thick, instead of ⅝ inch thick. All other aspects of the mold were identical to that described above. In addition, Isocyanates A, F and J were used in these examples.

TABLE 5

| EXAMPLES | Example 4 | Example 5 | Example 6 |
| --- | --- | --- | --- |
| Polyol A | 71.95 | 71.95 | 71.95 |
| Polyol B | 14.43 | 14.43 | 14.43 |
| 1,4-BD | 9.14 | 9.14 | 9.14 |
| EG | 0.97 | 0.97 | 0.97 |
| CAT A | 1.28 | 1.28 | 1.28 |
| CAT B | 1.05 | 1.05 | 1.05 |
| CAT D | 0.03 | 0.03 | 0.03 |
| L5309 | 0.7 | 0.7 | 0.7 |
| water | 0.45 | 0.45 | 0.45 |
| Isocyanate | A | F | J |
| ISO INDEX | 98 | 98 | 98 |

The molded panels from this series of examples which were based on allophanate modified isocyanate prepolymers also exhibited improved flexural properties in comparison to the carbodilmide modified isocyanate of U.S. Pat. No. 5,514,723. The results of the flex testing were as set forth in Table 6. Flex testing was done with a Ross flex tester, using a modified method of ASTM-D-1052 wherein the test specimens were not cut.

TABLE 6

| EXAMPLE | COMMENTS |
|---|---|
| Example 4 (comparative; based on a carbodiimide modified isocyanate) | One specimen began to crack at about 58,000 cycles. By about 132,000 cycles, each specimen had a deep crack (~1 mm) extending completely across the sample. |
| Example 5 (comparative; based on an allophanate modified isocyanate prepolymer wherein the polyether used contained 100% PO) | Both specimens exhibited "stretch marks" (but no cracks) at about 160,000 cycles. On one specimen, a crack began to form at about 300,000 flexes, and extended completely across the specimen by about 350,000 cycles. |
| Example 6 (based on an allophanate modified isocyanate prepolymer wherein the polyether used contained 50% by wt. PO and 50% by wt. EO) | Several small pinholes appeared in both specimens at about 200,000 cycles. Gradual growth of the pinholes, but no cracks were formed after 700,000 flexes (the point at which testing was stopped in this example). |

The testing of the examples set forth in TABLE 6 were run for 700,000 before the testing was stopped. This was sufficient to differentiate the examples.

TABLE 7

| EXAMPLE | 4 | 5 | 6 |
|---|---|---|---|
| Density (g/cc) | 0.53 | 0.50 | 0.50 |
| Hardness (Shore A) | 58 | 47 | 38 |
| Tensile Strength (psi) | 474 | 473 | 443 |
| Elongation (%) | 368 | 358 | 389 |
| Taber Abrasion (mg lost/1000 cycles) | 48 | 30.5 | 48.4 |

The advantages in flex testing of molded parts produced in accordance with the present invention were obtained without any significant losses occurring in other physical/mechanical properties as seen by comparing the test results of Example 6 vs. Examples 4 and 5 in Tables 6 and 7.

Another series of molded parts were produced. (See Tables 8 and 9.) These were, however, machine mixed using a Kymofoam Type KF-IS-202 foam machine at a mixed speed of about 3800 rpm at a temperature of about 26°–33° C., with a throughput of about 60 g/second. This series of molded parts used the formulations as set forth in Table 8, and Table 9 below summarizes the physical properties of the examples from Table 8.

This series of examples made it evident that, although it is possible to achieve good physical properties in the molded parts (foams) when the isocyanate prepolymer is based on a polyether containing 100% propylene oxide (PO), regardless of whether the foams were hand mixed or machine mixed, a problem arises routinely in the dimensional stability of machine mixed foams. Machine mixed foams are badly distorted on demold, having severe shrinkage or sinking in some areas, and large bulges in other areas. More simply, the molded part does not conform to the shape of the mold.

The reasons for this are unknown and unclear at this time. It appears that, however, hand mixing of formulations wherein the isocyanate is a prepolymer based on a polyether containing 100% PO tends to mask the dimensional instability which occurs with machine mixing. Although hand mixing may be suitable for laboratory and/or other small scale operations, it is not commercially acceptable and/or feasible due to the cost incurred and/or time constraints associated with hand mixing.

TABLE 8:

| EXAMPLES | Ex. 7 | Ex. 8 | Ex. 9 | Ex. 10 | Ex. 11 | Ex. 12 | Ex. 13 | Ex. 14 |
|---|---|---|---|---|---|---|---|---|
| Polyol A | 73.71 | 73.71 | 73.71 | 73.71 | 71.95 | 71.95 | 71.95 | 71.95 |
| Polyol B | 14.43 | 14.43 | 14.43 | 14.43 | 14.43 | 14.43 | 14.43 | 14.43 |
| 1,4-BD | 9.5 | 8.5 | 8.5 | 9.5 | 9.14 | 9.14 | 9.14 | 9.14 |
| EG | 0.97 | 0.97 | 0.97 | 0.97 | 0.97 | 0.97 | 0.97 | 0.97 |
| CAT A | 0.8 | 0.8 | 0.8 | 0.8 | 1.28 | 1.28 | 1.28 | 1.28 |
| CAT B | 0.21 | 0.21 | 0.21 | 0.21 | 1.05 | 1.05 | 1.05 | 1.05 |
| CAT C | 0.03 | 0.03 | 0.03 | 0.03 | 0 | 0 | 0 | 0 |
| CAT D | 0 | 0 | 0 | 0 | 0.03 | 0.03 | 0.03 | 0.03 |
| CAT E | 0.25 | 0.25 | 0.25 | 0.25 | 0 | 0 | 0 | 0 |
| L5309 | 0.7 | 0.7 | 0.7 | 0.7 | 0.7 | 0.7 | 0.7 | 0.7 |
| water | 0.4 | 0.4 | 0.4 | 0.4 | 0.45 | 0.45 | 0.45 | 0.45 |
| ISO | ISO B | ISO D | ISO D | ISO D | ISO G | ISO I | ISO K | ISO L |
| ISO INDEX | 98 | 98 | 98 | 98 | 98 | 98 | 98 | 98 |

TABLE 9:

| EXAMPLES | Ex. 7 | Ex. 8 | Ex. 9 | Ex. 10 | Ex. 11 | Ex. 12 | Ex. 13 | Ex. 14 |
|---|---|---|---|---|---|---|---|---|
| Density (g/cc) | 25.7 | 31.2 | 25.0 | 31 | 30.6 | 33.1 | 33.1 | 31.8 |
| Hardness (Shore A) | 35 | 47 | 28 | 37 | 40 | 33 | 41 | 38 |
| Tensile | 504 | 479 | 396 | 503 | 489 | 412 | 484.3 | 493 |

TABLE 9:-continued

| EXAMPLES | Ex. 7 | Ex. 8 | Ex. 9 | Ex. 10 | Ex. 11 | Ex. 12 | Ex. 13 | Ex. 14 |
|---|---|---|---|---|---|---|---|---|
| Strength (psi) | | | | | | | | |
| Elongation (%) | 406 | 463 | 529 | 408 | 462 | 392 | 392 | 473 |
| Die C Tear (pli) | 75.4 | 92.6 | 67.6 | 82.2 | 83.1 | 104.1 | 95.8 | 86.9 |
| Ball Rebound (%) | 11.6 | 49.8 | 34.8 | 29.6 | 41.7 | 27.1 | 19.4 | 22.0 |
| Taber Abrasion | 285.3 | 99.6 | 101.3 | 66.9 | 39.8 | 70.9 | 47.8 | 51.4 |
| Dimensional Stability | very poor[4] | poor[3] | poor[3] | poor[3] | good[2] | good[2] | good[2] | good[2] |

[1]mg lost/1000 cycles
[2]Molded panel conforms to shape of mold. No visible distortion.
[3]Distortions in shape of molded part. Edges are warped instead of straight.
[4]In addition to having distortions in shape of molded part and edges being warped instead of straight, the surface has large bulges and areas of extreme shrinkage.

The mold cavity for these examples formed a "rectangular parallelepiped", that is the bases were rectangular (actually square) with perpendicular faces. Thus, with respect to dimensional stability, a "good" rating denotes a part which conformed to the shape of the mold, i.e., was a rectangular parallelepiped; a "poor" rating denotes a part which showed distortion such that, for example, the angles between faces were not 90°, but the surfaces were relatively flat. A "very poor" rating denotes a part that exhibits large bulges and areas of shrinkage or sinking as well as the angular distortion described above.

Two examples are set forth in Tables 10 and 11. Table 10 sets forth the formulations and Table 11 sets forth the properties. The properties were determined using the ASTM methods set forth previously, with the exception of flex data. The flex data was done on a Ross flex tester in accordance to ASTM-D-1052 with the test specimens being die cut as required by this ASTM. The test specimens for flex testing were 6 in.×6 in.×½ inch panels. Example 15 is a comparative example, and Example 16 is representative of the present invention. These foams were machine mixed as described above with respect to the formulations in Tables 8 and 9.

TABLE 10

| EXAMPLES | 15 | 16 |
|---|---|---|
| Polyol A | 71.95 | 71.95 |
| Polyol B | 14.43 | 14.43 |
| 1,4-BD | 9.14 | 9.14 |
| EG | 0.97 | 0.97 |
| CAT A | 1.28 | 1.28 |
| CAT B | 1.05 | 1.05 |
| CAT D | 0.03 | 0.03 |
| L5309 | 0.7 | 0.7 |
| water | 0.45 | 0.45 |
| ISO | A | G |
| ISO INDEX | 98 | 98 |

TABLE 11

PHYSICAL PROPERTIES OF EXAMPLES 15 AND 16

| EXAMPLES | 15 | 16 |
|---|---|---|
| Density (g/cc) | 33.1 | 33.7 |
| Hardness (Shore A) | 58 | 56 |
| Tensile Strength (psi) | 474 | 461 |
| Elongation (%) | 368 | 410 |
| Die C Tear Strength (pli) | 71 | 81 |

TABLE 11-continued

PHYSICAL PROPERTIES OF EXAMPLES 15 AND 16

| EXAMPLES | 15 | 16 |
|---|---|---|
| Taber Abrasion[1] | 48 | 43 |
| Ross Flex (at -20° C.) | 900% cut growth at 60,000 cycles | no cut growth at 100,000 cycles |

[1]mg lost/1000 cycles

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A molded article comprising a micro cellular polyurethane foam, and being the reaction product of
   (A) a stable, liquid MDI-based prepolymer having an NCO content of 5 to 30%, and containing an allophanate-modified MDI, wherein said prepolymer comprises the reaction product of:
      (1) an allophanate-modified MDI prepared by reacting
         (i) an aliphatic alcohol or an aromatic alcohol, wherein said alcohol contains less than 17 carbon atoms,
         with
         (ii) diphenylmethane diisocyanate comprising about 0 to 60% by weight of 2,4'-diphenylmethane diisocyanate, less than 6% by weight of the 2,2'-diphenylmethane diisocyanate, and the rest being 4,4'diphenylmethane diisocyanate,
         and
      (2) a polyether polyol containing from 2 to 3 hydroxyl groups and having a molecular weight of about 750 to 10,000, said polyether polyol being prepared from a starter compound with ethylene oxide and propylene oxide in a weight ratio of from 10:90 to 70:30;
      with
   (B) an isocyanate-reactive composition comprising:
      (1) from about 25 to about 92% by weight, based on the total weight of component (B), of at least one polyether polyol having a functionality of 2 and a molecular weight of from about 3,000 to about 8,000,
      (2) from about 5 to about 72% by weight, based on the total weight of component (B), of a filled polyol wherein said filled polyol has a functionality of about 2.5 to 3 and a molecular weight of from about 3,000 to about 8,000, and (3) from about 3 to about 30% by weight, based on the total weight of component (B), of at least one organic compound containing from 2 to 4 hydroxyl groups and having a molecular weight of from about 28 to about 250;

in the presence of (C) a blowing agent, wherein the quantities of components (A) and (B) are such that the isocyanate index is from about 90 to about 110.

2. The molded article of claim 1, wherein said allophanate-modified MDI (A)(1) is prepared by reacting (i) an aliphatic alcohol or an aromatic alcohol, wherein said alcohol contains from 2 to 8 carbon atoms, with (ii) diphenylmethane diisocyanate comprising about 0 to 6% by weight of 2,4'-diphenylmethane diisocyanate, from about 0 to 2% by weight of 2,2'-diphenylmethane diisocyanate, and the rest being 4,4'-diphenyl-methane diisocyanate.

3. The molded article of claim 1, wherein said polyether polyol (A)(2) contains 2 hydroxyl groups, has a molecular weight of about 1,000 to about 6,000, and is prepared from a starter compound with ethylene oxide and propylene oxide in a weight ratio of from 13:87 to 50:50.

4. The molded article of claim 3, wherein the weight ratio of ethylene oxide to propylene oxide is from 15:85 to 35:65.

5. The molded article of claim 1, wherein said filled polyol (B)(2) comprises a dispersion of a polyurea and/or a polyhydrazodicarbonamide in an organic compound containing at least two hydroxyl groups.

6. The molded article of claim 1, wherein said filled polyol (B)(2) comprises a styrene-acrylonitrile graft polymer polyol.

7. The molded article of claim 1, wherein said filled polyol (B)(2) has a functionality of about 3 and a molecular weight of from about 4,800 to 6,000.

8. The molded article of claim 1, wherein said organic compound (B)(3) is selected from the group consisting of 1,4-butanediol, ethylene glycol and mixtures thereof.

9. The molded article of claim 1, wherein said allophanate-modified MDI (A)(1) is prepared by reacting (i) n-butanol with (ii) diphenylmethane diisocyanate comprising about 0 to 6% by weight of 2,4'diphenylmethane diisocyanate, from about 0 to 2% by weight of 2,2'-diphenylmethane diisocyanate, and the rest being 4,4'-diphenylmethane diisocyanate.

10. The molded article of claim 1, wherein said stable, liquid MDI-based prepolymer (A) has an NCO content of 14 to 20%.

11. The molded article of claim 9, wherein said allophanate-modified MDI (A)(1) has an NCO content of 23 to 30%.

12. The molded article of claim 11, wherein said allophanate-modified MDI (A)(1) has an NCO content of about 29%.

13. The molded article of claim 1, wherein said polyether polyol (A)(2) has a functionality of 2, a molecular weight of 4,000 and is prepared from ethylene oxide and propylene oxide in a weight ratio of 20:80 to 30:70.

14. The molded article of claim 1, wherein said blowing agent (C) comprises water.

15. The molded article of claim 1, wherein said reaction is in the presence of (D) additives comprising one or more catalyst, and/or one or more surfactants.

16. The molded article of claim 1, wherein the quantities of components (A) and (B) are such that the isocyanate index is from 96 to 103.

* * * * *

UNITED STATES PATENT AND TRADEMARK OFFICE
CERTIFICATE OF CORRRECTION

PATENT NO. : 5,889,068
DATED : March 30, 1999
INVENTOR(S) : Edmund J. Madaj, et al.

It is certified that error appears in the above-identified patent and that said Letters Patent is hereby corrected as shown below:

On the title page, item [56] insert the following:

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | 0 | 8 | 1 | 9 | 7 | 1 | 5 | 01/1998 | Europe | | | | |
| | 1 | 9 | 5 | 0 | 2 | 1 | 9 | 8 08/01/96 | Germany | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |

Signed and Sealed this

Twenty-sixth Day of October, 1999

*Attest:*

Q. TODD DICKINSON

*Attesting Officer*  *Acting Commissioner of Patents and Trademarks*